United States Patent [19]
Tang et al.

[11] Patent Number: 5,989,392
[45] Date of Patent: Nov. 23, 1999

[54] METHOD OF USING POLYAMMONIUM QUATERNARY FOR CONTROLLING ANIONIC TRASH AND PITCH DEPOSITION IN PULP CONTAINING BROKE

[75] Inventors: Jiansheng Tang, Naperville; Jeffrey R. Cramm, Batavia; Michael R. St. John, Chicago; Laura M. Sherman, Naperville, all of Ill.

[73] Assignee: Nalco Chemical Company, Naperville, Ill.

[21] Appl. No.: 08/926,659

[22] Filed: Sep. 10, 1997

[51] Int. Cl.$^6$ ................................. D21F 1/66; D21C 5/02
[52] U.S. Cl. ..................... 162/191; 162/199; 162/DIG. 4
[58] Field of Search .................... 162/5, 189, 19, 162/199, DIG. 4, 168.2, 164.6

[56] References Cited

U.S. PATENT DOCUMENTS

| | | | |
|---|---|---|---|
| 3,562,226 | 2/1971 | Gayley et al. | 260/80.3 |
| 3,968,037 | 7/1976 | Morgan et al. | 40/10 |
| 4,100,079 | 7/1978 | Sinkovitz et al. | 252/8.55 |
| 4,151,202 | 4/1979 | Hunter et al. | 260/576.5 |
| 4,225,445 | 9/1980 | Dixon | 252/8.57 |
| 4,704,190 | 11/1987 | Harada et al. | 162/168.2 |
| 5,131,982 | 7/1992 | St. John | 162/168.2 |
| 5,180,473 | 1/1993 | Akune et al. | 162/168.2 |
| 5,223,097 | 6/1993 | Hassler | 162/161 |
| 5,246,547 | 9/1993 | Finck et al. | 162/164.6 |
| 5,387,318 | 2/1995 | Laio et al. | 162/5 |
| 5,393,380 | 2/1995 | Reed et al. | 162/168.2 |
| 5,393,381 | 2/1995 | Hund et al. | 162/168.3 |
| 5,466,338 | 11/1995 | Pearson | 162/168.2 |
| 5,527,431 | 6/1996 | Shetty et al. | 162/164.4 |

FOREIGN PATENT DOCUMENTS

| | | |
|---|---|---|
| 1150914 | 8/1983 | Canada . |
| 1194254 | 10/1985 | Canada . |
| 0374458A2 | 6/1990 | European Pat. Off. . |
| 0 264 710 B1 | 5/1993 | European Pat. Off. . |
| 0 202 780A | 11/1996 | European Pat. Off. . |
| 0 752 496 | 1/1997 | European Pat. Off. . |
| 1494438 | 9/1967 | France . |
| 2589145 | 4/1987 | France . |
| 213942 | 9/1984 | Germany . |
| 37 33587A1 | 4/1988 | Germany . |
| 3733587 | 4/1988 | Germany . |
| 261800A1 | 11/1988 | Germany . |
| 292218A5 | 7/1991 | Germany . |
| 292219A5 | 7/1991 | Germany . |
| 292612A5 | 8/1991 | Germany . |
| 292641A5 | 8/1991 | Germany . |
| 292642A5 | 8/1991 | Germany . |
| 293500A5 | 9/1991 | Germany . |
| 900-41528 | 9/1990 | Japan . |
| 1595851A1 | 9/1990 | Russian Federation . |
| WO 95/33097 | 12/1995 | WIPO . |
| WO 97/18351A | 5/1997 | WIPO . |

*Primary Examiner*—Dean T. Nguyen
*Attorney, Agent, or Firm*—Kelly L. Cummings; Margaret M. Brumm; Thomas M. Breininger

[57] ABSTRACT

A method is disclosed for controlling anionic trash and pitch deposition and treating coated broke which comprises the step of adding a polyammonium quaternary to a pulp and papermaking system. The polyammonium quaternary, which may be either branched or crosslinked, comprises at least one cationic monomer, preferably diallyldimethylammonium chloride, and at least one branching or crosslinking monomer, preferably N,N,N-triallylamine or N,N,N-triallylamine hydrochloride.

5 Claims, No Drawings

METHOD OF USING POLYAMMONIUM QUATERNARY FOR CONTROLLING ANIONIC TRASH AND PITCH DEPOSITION IN PULP CONTAINING BROKE

FIELD OF THE INVENTION

This invention relates generally to a treatment for pulp and papermaking systems and, more particularly, to a branched or crosslinked polyammonium quaternary for controlling anionic trash and pitch deposition and treating coated broke.

BACKGROUND OF THE INVENTION

Synthesis of PolyDADMACs

The synthesis of low to medium molecular weight cationic polyelectrolytes through cyclopolymerization of diallyldialkylammonium halides, particularly diallyldimethylammonium chloride (DADMAC) is well known in the art, and these polymers have been used extensively as coagulants in many practical applications. Although a linear polymeric structure is normally prepared, various multifunctional vinyl monomers and synthetic procedures can be employed which lead to the branching or crosslinking of the polymer. Polymers which are branched maintain a discrete molecular identity with smaller polymeric segments emanating from the main polymeric chain. Crosslinked polymers have a connection between discrete polymer chains to form a network-type structure.

The following patents disclose various syntheses and applications of polyDADMACS:

Japanese Patent No. 90041528 discloses a method for the synthesis of water insoluble crosslinked polyDADMACs, useful as ion exchange resins. The crosslinked polyDADMACs are copolymers of 74/26 DADMAC/TAPD and 67/36 DADMAC/N,N'-dimethyl-N,N,N'N'-tetraallyl-2-butene-1,4-diammonium dichloride.

French Patent No. 1,494,438 discloses a composition and method of synthesizing a water soluble, highly crosslinked diallylammonium chloride composition, typically a water soluble, highly crosslinked polyDADMAC. The crosslinking agents used in this patent are triallylamine hydrochloride, methylene bisacrylamide and tetraallylammonium chloride. The composition is synthesized in solution form and is useful for electron conductive paper coating applications.

U.S. Pat. No. 4,100,079 discloses that copolymers of DADMAC and a monomer capable of post-crosslinking polymerization are useful as acid thickeners in oil well drilling and fracturing operations because of their acid, heat, and salt stability.

U.S. Pat. No. 4,225,445 discloses that branched emulsion or suspension polymers of DADMAC are useful for acid thickening in oil well drilling and fracturing fluids.

U.S. Pat. No. 3,968,037 discloses that highly crosslinked cationic polyelectrolytes as highly effective flocculants for dewatering of activated sewage may be produced by the inverse emulsion polymerization of water soluble cationic monomers, including DADMAC, in the presence of a polyolefinic unsaturated comonomer. The highly branched cationic polyelectrolytes synthesized in the inverse emulsion form have better water solubility than those synthesized in solution, suspension or bulk polymerizations.

European Patent No. 0 374 458 discloses a composition and method for making highly branched, water soluble polymers with high molecular weight, including highly branched polyDADMAC. The composition is useful as a flocculant. The method comprises polymerizing one or more water soluble monomers (including DADMAC) and a branching agent (methylene bisacrylamide) in the presence of a chain transfer agent (isopropanol). The composition is useful in flocculating dispersions of suspended solids, such as sewage sludge.

European Patent No. 0 264 710 B1 discloses a composition and method for synthesizing highly branched, water soluble polyDADMACs. The method comprises adding a mixture of a branching agent and DADMAC monomer to the reactor in the presence of a chain transfer agent (triethanolamine).

German Patent No. DD 292 641 A5 discloses that water soluble, highly branched polyDADMACs are useful as flocculants for the removal of solids from aqueous suspensions of sludge containing coal and for the dewatering of sludge from industrial waste water or sewage. The process can be used in the manufacturing of briquettes to obtain usable water and to recover coal. The water can be used directly and the separated solids can be used as fuel.

German Patent No. DD 292 218 A5 discloses that water soluble, highly branched polyDADMACs are useful in the dewatering of sludge from industrial waste water or sewage. The process can be used to remove suspended inorganic solids in processing water, in clarification of municipal or industrial water, and in technical separation processes.

German Patent No. DD 292 219 A5 discloses the preparation of a highly branched polyDADMAC, which is subsequently heated and stirred to remove water to obtain a powder with an active substance content of 70%.

German Patent No. DE 3733587 A1 discloses that water soluble, highly branched polyDADMACs are useful in retention and drainage in paper manufacturing.

German Patent No. DD 293 500 A5 discloses that highly branched polyDADMACs are effective in the removal of suspended solids from waste water and waters containing 10-4-10 g solids/L.

German Patent No. DD 292 642 A5 discloses that solids are separated from aqueous suspensions or slurries by the addition of a water insoluble acryloguanamine copolymer, and a water soluble, highly branched polyDADMAC. The process is useful in processing drinking water, in the production of usable water, and in the purification of municipal and industrial waste waters.

Soviet Union Patent No. SU 1595851 A1 discloses a method for preparing methylene bisacrylamide-crosslinked polyDADMAC in emulsion or in alcohol. The resulting polymer is useful as a sorbent.

German Patent No. DD 261 800 A1 discloses that water soluble, highly crosslinked polyDADMACs are useful as reversible bonding packaging materials such as paperboards.

U.S. Pat. No. 5,393,381 discloses that the use of branched polyacrylamide and bentonite together has a synergistic effect on the retention of the bentonite in the sheet to yield paper having improved quality, opacity and smoothness, reduced porosity, improved absorbency, improved running on the machine, better production economy, and lower concentration of residual bentonite in the backwater, thus reducing problems of disposal. The branched polyacrylamide is preferably a cationic copolymer of acrylamide and a cationic ethylenically unsaturated monomer chosen from quaternized or salified dimethylaminoethyl acrylate, acrylamidopropyltrimethylammonium chloride, DADMAC and dimethylaminoethyl methacrylate.

U.S. Pat. No. 5,387,318 discloses that polyacrylamide grafted with cationic polymers, optionally with a branching agent, are useful for laser print deinking loop clarification.

Anionic Trash and Pitch Deposition Control

The term "anionic trash," as used herein, means soluble anionic materials of either the macromolecule or surfactant type, and includes soluble wood extractives released from wood during mechanical and chemical pulping processes, as well as chemical additives introduced during papermaking processes. Anionic trash is detrimental to paper machine operation and has a negative impact on the performance of retention aids and other cationic additives. For instance, it is well known in the art that the addition of a cationic polyelectrolyte to a process containing anionic trash results in the formation of an inactive complex. In such a case, an excess of retention aids will be required to promote retention. Accordingly, anionic trash control is important during papermaking processes, especially during mechanical papermaking processes.

The term "pitch" generally refers to emulsified hydrophobic organics. As used herein, with reference to papermaking systems, "pitch" can be simply defined as the sticky, resinous materials that are released from wood during the pulping process. In paper mill process waters, pitch exists as unstable, colloidal dispersions of hydrophobic particles. Therefore, typical papermaking system conditions, such as hydrodynamic and mechanical shear forces, abrupt pH and temperature changes, and exposure to water hardness ions and inorganic scale deposits, will cause the colloidal pitch particles to agglomerate and deposit on paper machine surfaces. Pitch has also come to include sticky materials which arise from components of recycled fiber, such as adhesives, and are often referred to as stickies and tackies.

Pitch deposits often lead to quality defects in the finished product, shortened equipment life, impaired system operation, paper machine downtime and, ultimately, lost profits for the mill. These problems are magnified when paper mills "close up" their process water systems, as many mills have already done for conservation and environmental reasons, thus eliminating many potential exit points for pitch in the system. A closed, recirculating papermaking process water system only has a limited holding capacity for hydrophobic materials like pitch. Unless these pitch particles are continuously removed from the system in a controlled manner, spontaneous system purges can occur which lead to pitch deposit and runnability problems. Thus, the control of pitch deposition in a papermaking system is a priority for many papermakers.

A number of anionic trash and pitch deposition control methods are used in the paper industry. For example, optimizing the performance of the pulp washing stages (e.g., kraft brown stock washers and bleach plant extraction stages) through the application of pitch dispersants and defoamers or wash aids to these stages is a control option for many mills. Also, the removal of pitch through viable exit points is especially important in closed papermaking systems. In addition, the use of pitch adsorbents such as talc is often employed. However, unless the talc/pitch particles are effectively retained to in the paper sheet, talc can end up contributing to, rather than solving, the pitch deposition problem.

Alum is a widely used anionic trash and pitch control agent for acid papermaking systems. It acts to attach pitch particles to fibers in a manner analogous to the setting of rosin size. Cationic coagulants promote the attachment of the anionically charged, colloidal pitch particles to fibers and fines through a charge neutralization mechanism.

The advantage of using cationic coagulants and alum for anionic trash and pitch control is the anionic trash and pitch are removed from the system in the form of microscopic particles dispersed among the fibers in the finished paper product. Unlike alum, a polymer's cationic charge is not necessarily dependent on the pH of the system, thus cationic polymers can be used effectively in acidic, neutral and alkaline paper machines.

In addition, cationic polymers remain soluble under normal alkaline papermaking conditions while alum can form insoluble aluminium hydroxide, which may result in unwanted deposits.

A desirable cationic polymer is one which can effectively and efficiently control both anionic trash and pitch deposition. Many prior art polymers are effective and efficient in pitch deposition control, but not anionic trash control, and vice versa.

The cationic polymers that are used commercially in the paper mills as anionic trash and pitch control agents are homopolymers of DADMAC. Another group of polymers that has been used for anionic trash and pitch deposition control are the polymers formed from epichlorohydrin and dimethylamine. The former is disclosed in Canadian Patent No. 1,194,254, and the latter is disclosed in Canadian Patent No. 1,150,914.

U.S. Pat. No. 5,393,380 discloses the use of the copolymers formed from DADMAC and 3-acrylamide-3-methylbutanoic acid in pitch control. The effectiveness and efficiency of these types of copolymers for anionic trash control are not mentioned.

U.S. Pat. No. 5,246,547 discloses the use of a hydrophobically-modified polyelectrolyte for pitch deposition control. This hydrophobically-modified polyelectrolyte is formed by the copolymerization of DADMAC with a hydrophobically-modified monomer, such as dimethylaminoethyl(meth)acrylate benzyl chloride quaternary. The patent states that the pitch deposition inhibition activity of the hydrophobically-modified polymers are essentially equal to that of a linear polyDADMAC. The effectiveness and efficiency of the hydrophobically-modified polymers for anionic trash control, however, are not mentioned.

U.S. Pat. No. 5,527,431 discloses a hydrophobic silicone-containing polyelectrolyte copolymer comprising DADMAC and a hydrophobic vinyl alkoxysilane. Although this silicone-containing polyDADMAC is said to be unique for pitch deposition control, the activity of this polymer with respect to anionic trash control is not discussed.

The use of branched or crosslinked polyammonium quaternaries in anionic trash and pitch deposition control is unknown in the prior art. Emphasis for better pitch control has traditionally been placed in hydrophobically-modified cationic polymers. The present inventors discovered the effect of the polymer's branching or crosslinking on the polymer's activity in anionic trash and pitch deposition control, and found that branched or crosslinked polyammonium quaternaries, specifically branched or crosslinked polyDADMACs, have higher activities than other DADMAC-based polymers.

Coated Broke Treatment

"Paper Broke" is a term used by papermakers to describe that paper which they cannot or do not sell because it does not meet minimum commercial specifications. Paper broke, however, is a valuable source of fiber and is recycled internally at the mill or sold to other mills. Unfortunately, paper broke frequently contains coatings which are applied to base paper sheet as it is being manufactured. When the paper broke contains these coatings it is referred to as "coated broke." Coated broke presents special problems in the recovery of fiber values because the coatings introduce materials which would not normally be present in the original stock of fiber used to manufacture the base paper sheet.

The coating materials contained in coated broke may account for about 10 to about 40 weight percent of the total solids in the paper finish. The major components of the coatings are pigments which normally constitute from about 80 to 95% of the coating mass, and binders which constitute from about 5 to 20% of the coating mass.

The pigments normally are composed of typical pigments and fillers used in the manufacture of paper, including clays of various types, calcium carbonate, titanium dioxide, and other similar or specialty pigments and fillers.

The binders used are frequently obtained from normal latex polymers such as those derived from styrene-butadiene resins, polyvinyl acetate resins, polyvinylalcohol resins, and polyacrylic or polyacrylate resins. The binders may also include certain natural products such as starches and dextrins. Certain binders can be customized depending upon the end result desired by the papermaker.

The combination of the binders with the pigments and fillers, all of which are contained as part of the coating in a coated broke, presents certain problems when the coated broke is recycled to recover fiber value. The most difficult problem is due to the binder materials which, sometimes in combination with the pigments or fillers, form sticky deposits. These sticky deposits, referred to as "white pitch," cause difficulties when recycled back to the paper machine operation. Other problems include those associated with the standard pitch derived from natural wood fibers. Moreover, the inclusion of coated broke can result in paper which fails to meet specifications because of holes and/or deposits of the white pitch, machine downtime resulting from sheet breaks or more frequent machine cleanup, clogging of felts used in the manufacture of base sheet, and the like.

Polymers derived from crosslinked or linear epichlorohydrin/dimethylamine (EPI-DMA) reactants have been successfully used to treat coated broke. Although these polymers are highly cationically charged, they have very low molecular weight (intrinsic viscosity about 0.3 dl/g). Copolymers of higher molecular weight, comprising DADMAC and acrylamide, have been used to provide improved treatment of coated broke relative to polymers derived from EPI-DMA, in terms of effectiveness and efficiency. Dispersion polymers derived from a cationic monomer and acrylamide have also been disclosed to be more effective than polymers derived from EPI-DMA and equally effective to copolymers derived from DADMAC and acrylamide in coated broke treatment (U.S. Pat. No. 5,466,338). In addition, it has been suggested that linear polyDADMACs be used to treat coated broke (U.S. Pat. No. 5,131,982).

The effectiveness of a given treating polymer in coated broke treatment is the percentage "white pitch" deposits that can be inhibited relative to no treatment. The efficiency of a given treating polymer in coated broke treatment is the dose of the polymer required to inhibit or reduce the "white pitch" to a specific level. The more effective the treating polymer, the less white pitch will deposit. The more efficient the treating polymer, the less treating polymer will be necessary to be applied to control the "white pitch" deposits. In other words, the more efficient the treating polymer, the more cost effective the coated broke treating program.

The present inventors have discovered that water soluble, branched or crosslinked polyDADMACs can be successfully used to control "white pitch" by removing the "white pitch" from the system in the form of microscopic particles dispersed among the fibers. The branched or crosslinked polyDADMACs have added advantages over EPI-DMA based polymers, linear polyDADMACs, and acrylamide-based polymers in that they are more effective and efficient than EPI-DMA based copolymers and linear polyDADMACs, and at least as efficient as acrylamide-based polymers.

SUMMARY OF THE INVENTION

The present invention is directed to a method for controlling anionic trash and pitch deposition and treating coated broke comprising the step of adding a polyammonium quarternary to a pulp and papermaking system. The polyammonium quaternary, which may be either branched or crosslinked, comprises at least one cationic monomer having the chemical formula

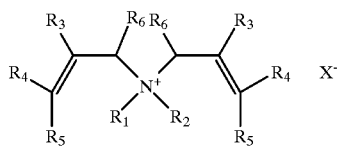

wherein $R_1$ and $R_2$ are each hydrogen or alkyl groups having from 1 to 24 carbon atoms; $R_3$, $R_4$, $R_5$ and $R_6$ are each hydrogen, methyl groups, or ethyl groups; and X– is an anionic counterion; and at least one radical-initiated branching or crosslinking monomer. The preferred cationic monomer is diallyldimethylammonium chloride and the branching or crosslinking monomer is preferably N,N,N-triallylamine or N,N,N-triallylamine hydrochloride.

DETAILED DESCRIPTION OF THE INVENTION

It is commonly thought that cationic polymers act purely by charge neutralization to allow colloidal pitch microparticles to attach to anionic wood fiber instead of the hydrophobic plastic surfaces of the headbox and other papermaking machine parts. It has been discovered by the present inventors that surface charge neutralization of anionic trash and colloidal pitch in the papermaking process water suspension can be enhanced by the use of branched or crosslinked polyammonium quaternaries (quats). The branched or crosslinked polyammonium quats are formed by polymerizing a mixture containing (1) at least one cationic monomer having the formula

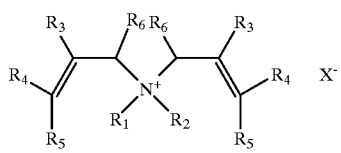

wherein $R_1$ and $R_2$ are each hydrogen or alkyl groups having from 1 to 24 carbon atoms; $R_3$, $R_4$, $R_5$ and $R_6$ are each hydrogen, methyl groups or ethyl groups; and X– is an anionic counterion; and (2) at least one radical-initiated branching or crosslinking monomer.

The cationic monomers that can be used in this invention include diallyldimethylammonium halides, diallyldiethylammonium halides, diallylmethylammonium hydrohalides and diallylammonium dihydrohalides. Diallyldimethylammonium chloride (DADMAC) is preferred and can be prepared in accordance with any commercial manner, such as the method described in U.S. Pat. No. 4,151,202, the disclosure of which is incorporated herein by reference.

Suitable branching or crosslinking monomers (hereinafter collectively referred to as "crosslinking monomers") include compounds having more than one vinyl group such as methylene bisacrylamide (MBA), methylene bismethacrylamide, divinylbenzene, glyconate-1,2-bisacrylate, glycolate-1,2-methacrylate; vinyl-methylol compounds such as methylolacrylamide and methylolmethacrylamide; compounds containing two or more substituted allyl groups such as N,N-diallylamine, N,N-diallylamine hydrochloride, N,N,N-triallylamine (TAA), N,N,N-triallylamine hydrohalide, N-methyl-N,N,N-triallylammonium halide, N,N,N,N-tetraallylammonium halide, diallylfumurate, diallylmeleate; piperazine derivatives such as N,N,N'N'-tetraallylpiperazinium dichloride (TAPD) having the formula

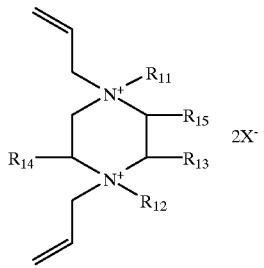

wherein $R_{11}$ and $R_{12}$ are each selected as hydrogen, allyl groups, benzyl groups, or alkyl groups having from 1 to 24 carbon atoms; $R_{13}$, $R_{14}$ and $R_{15}$ are each hydrogen or alkyl groups having from 1 to 24 carbon atoms; and X— is an anionic counterion; and compounds containing two or more allyl groups having the formula

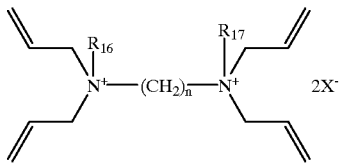

wherein $R_{16}$ and $R_{17}$ are each selected as hydrogen, alkyl groups having from 1 to 4 carbon atoms, allyl groups, or benzyl groups; n is an integer from 1 to 10; and X– is an anionic counterion. The crosslinking monomer is preferably N,N-diallylamine, N,N-diallylamine hydrochloride, N,N,N-triallylamine, N,N,N-triallylamine hydrochloride, methylene bisacrylamide, N,N,N'N'-tetraallylpiperazinium dichloride or a mixture thereof. N,N,N-triallylamine and N,N,N-triallylamine hydrochloride are the most preferred crosslinking monomers.

At least one of the crosslinking monomers can be mixed either before polymerization, during polymerization or at the post-treatment stage with at least one of the cationic monomers, preferably with DADMAC.

One or more chain transfer agents may optionally be added to the mixture. Suitable chain transfer agents include molecules which can form relatively stable radicals or have extractable hydrogen atoms such as thioglycolic acid, mercaptans, triethanolamine, isopropanol, sorbitol, glycolic acid and sodium formate. The chain transfer agent(s) can either be mixed before polymerization with DADMAC or with at least one of the other cationic monomers during polymerization.

Any radical initiators may be used in the practice of the present invention. Suitable radical initiators include ammonium persulfate (APS), ammonium persulfate/sodium meta sulfite, 2,2'-azobis(2-aminopropane)dichloride (Vazo-50), 2,2',-azobis(2,4-dimethylpentanenitrile) (Vazo-52), 2,2'-azobis(propanenitrile) (Vazo-64), hydrogen peroxide, t-butyl hydroperoxide or a mixture thereof. The preferred initiator is ammonium persulfate, Vazo-50, Vazo-52, Vazo-64 or a mixture thereof. The radical initiator(s) can be mixed before polymerization with the cationic monomer or slowly and continuously fed during the polymerization process.

In accordance with the present invention, the branched or crosslinked polyammonium quat can be prepared in accordance with any known procedure by solution polymerization, water-in-oil polymerization, dispersion polymerization and the like.

In a preferred embodiment of the present invention, the branched or crosslinked polyammonium quat is prepared by solution polymerization. The reduced specific viscosity (RSV) of the branched or crosslinked polyammonium quat formed from solution polymerization in one molar sodium nitrate solution for one percent by weight of polymer actives is from about 0.1 to 7 dl/g, preferably from about 0.5 to 5 dl/g and most preferably from about 0.7 to 3 dl/g. The intrinsic viscosity (IV) of the branched or crosslinked polyammonium quat made from solution polymerization is from about 0.1 to 4.0 dl/g, preferably from about 0.4 to 3.0 dl/g and most preferably from about 0.7 to 2.5 dl/g.

The method of preparation calls for forming a polymerization mixture by admixing in an aqueous medium from about 0 to 30% by weight of an inorganic salt at least partially soluble in the aqueous reaction medium, from about 25 to 70% by weight of a diallyldialkylammonium halide compound, preferably DADMAC, and at least one crosslinking monomer. The molar ratio of the diallyldialkylammonium halide to the crosslinking monomer(s) ranges from about 95/5 to 99.9999/0.0001, preferably from about 97/3 to 99.999/0.001 and most preferably from about 99/1 to 99.99/0.01. The ratio is dependent upon the type of crosslinking monomers utilized because the effective amount varies from one crosslinking monomer to another. One or more of the chain transfer agents described above may optionally be added to the polymerization mixture in an amount such that the molar ratio of diallyldialkylammonium halide to the chain transfer agent(s) ranges from about 95/5 to 99.99/0.01 and preferably from about 98/2 to 99.9/0.1. One or more surfactants may also optionally be added to the mixture in the range of about 0.01 to 10% by weight and preferably from about 0.1 to 5% by weight.

The polymerization mixture is next purged with an inert gas and heated with agitation to a temperature from about 20 to 90° C. One or more of the above-mentioned water-soluble radical initiators in the range of about 0.2 to 5.0% by weight are then slowly fed into the polymerization mixture. The temperature of the mixture is maintained in the range of about 20 to about 90° C. for a time period sufficient to polymerize the monomer(s) and form a branched or crosslinked polydiallyldialkylammonium halide.

Water may be added periodically when the reaction mixture becomes very viscous during the polymerization process. After polymerization, the polymer may be recovered, i.e., removed from the reactor and handled as necessary. For instance, it may be diluted with water and used as such. Alternatively, the polymer may be concentrated or dried and ground, and used as such.

In another preferred embodiment of this invention, the branched or crosslinked polyammonium quat is prepared by water-in-oil polymerization. The reduced specific viscosity of the branched or crosslinked polyammonium quat formed from water-in-oil emulsion polymerization in 0.30 percent of polymer actives in one molar sodium nitrate is from about 0.2 to 9 dl/g, preferably from about 0.4 to 7 dl/g and most preferably from about 1.0 to 4 dl/g. The intrinsic viscosity of the branched or crosslinked polyammonium quat made from water-in-oil emulsion polymerization is from about 0.1 to 6.0 dl/g, preferably from about 0.4 to 4.0 dl/g and most preferably from about 0.8 to 3.0 dl/g.

The method of preparation calls for forming a monomer phase by admixing in an aqueous medium from about 0 to 5% by weight of an inorganic salt at least partially soluble in the aqueous medium, from about 15 to 70% by weight based on the final emulsion weight of a diallyldialkylammonium halide compound, preferably DADMAC, and at least one crosslinking monomer. The molar ratio of the diallyldialkylammonium halide to the crosslinking monomer(s) ranges from about 95/5 to 99.9999/0.0001, preferably from about 97/3 to 99.999/0.001 and most preferably from about 99/1 to 99.99/0.01. The ratio is dependent upon the type of crosslinking monomers utilized because the effective amount varies from one crosslinking monomer to another. One or more of the chain transfer agents mentioned above may optionally be added to the monomer phase in an amount such that the molar ratio of diallyldialkylammonium halide to the chain transfer agent(s) ranges from about 95/5 to 99.99/0.01 and preferably from about 98/2 to 99.9/0.1. One or more surfactants may also optionally be added to the monomer phase in the range of about 0.01 to 10% by weight and preferably from about 0.1 to 5% by weight.

The pH of the monomer phase is adjusted with an acid to between 2 and 10, more preferably between 3 and 9 and most preferably between 3.5 and 5. A pH buffer compound, such as 1,6-hexylene dicarboxylic acid, may also be added in an amount of from about 0.1 to 2% by weight.

An oil phase is next formed by admixing one or more emulsifying compounds of any type, which alone or in combination form a stable emulsion polyammonium quat of preferably relatively high intrinsic viscosity in the range of about 1 to 8% by weight based on the final weight of the emulsion polymer and from about 2 to 30% by weight of any water-insoluble solvent. The mixture of the emulsifying compounds and the oil is heated with agitation to allow the emulsifying compounds to dissolve in the oil.

The monomer phase is then mixed together and homogenized until the particle size is in the range of about 0.5 to 5 microns. Next, the polymerization emulsion is agitated and then purged with an inert gas either before or after the addition of an initiator. One or more of the water-soluble or oil-soluble initiators mentioned above are then added to the emulsion in either a batch or semibatch-continuous feed fashion in the range of about 0.2 to 5.0% by weight. The temperature of the polymerization emulsion is maintained in the range of about 20 to 90° C. for a time period sufficient to polymerize the monomers and form a stable emulsion of a branched or crosslinked polyammonium quat.

After polymerization, the polymer may be recovered, i.e., removed from the reactor and handled as necessary. It may be made into a single component by admixing the emulsion with at least one inverting activator.

EXAMPLES

The following examples are intended to be illustrative of the present invention and to teach one of ordinary skill how to make and use the invention. These examples are not intended to limit the invention or its protection in any way.

Example 1

Branched or Crosslinked PolyDADMAC Solutions

Ten crosslinked polyDADMAC solutions (Polymer Nos. 1–10) and one branched polyDADMAC solution (Polymer No. 11) were prepared as described below in Table 1.

TABLE 1

| Polymer No. | Initial DADMAC conc. (wt %) | Initial NaCl conc. (wt %) | Initiator level as of monomer (wt %) | Feeding molar ratio | RSV of 1% (wt) polymer in 1M NaNO$_3$ | RSV of 1% (wt) polymer in 1M NaCl | Intrinsic viscosity in 1M NaNO$_3$ | Intrinsic viscosity in 1M NaCl | Cationic charge density, meq/g theoretical/measured |
|---|---|---|---|---|---|---|---|---|---|
| 1 | 49 | 19 | 0.83% APS | 99.965/0.035 DADMAC/TAPD | 2.01 | 1.80 | 1.37 | 1.61 | 6.19/6.40 |
| 2 | 49 | 19 | 0.83% APS | 99.982/0.018 DADMAC/TAPD | 1.90 | — | 1.26 | — | 6.19/6.37 |
| 3 | 49 | 19 | 0.83% APS | 99.950/0.050 DADMAC/TAPD | 1.84 | — | 1.30 | — | 6.19/5.92 |
| 4 | 49 | 19 | 0.83% APS | 99.9/0.1 DADMAC/TAA | 1.83 | 2.83 | 1.21 | — | |
| 5 | 57 | 2 | 0.83% APS | 99.93/0.07 DADMAC/TAA | 1.64 | — | 1.22 | — | |
| 6 | 49 | 17 | 0.74% V-50 | 99.975/0.025 DADMAC/TAPD | 3.46 | — | 2.10 | — | 6.19/5.92 |
| 7 | 48 | 17 | 0.74% V-50 | 99.994/0.006 DADMAC/TAPD | 3.09 | — | 1.78 | — | |
| 8 | 48 | 17 | 0.74% V-50 | 99.9875/0.0125 DADMAC/TAPD | 3.42 | — | 1.60 | — | |
| 9[a] | 49 | 1 | 0.72% APS 0.36% V-50 | 99.975/0.025 DADMAC/TAPD | 1.97 | — | 1.25 | — | |

TABLE 1-continued

| Polymer No. | Initial DADMAC conc. (wt %) | Initial NaCl conc. (wt %) | Initiator level as of monomer (wt %) | Feeding molar ratio | RSV of 1% (wt) polymer in 1M NaNO$_3$ | RSV of 1% (wt) polymer in 1M NaCl | Intrinsic viscosity in 1M NaNO$_3$ | Intrinsic viscosity in 1M NaCl | Cationic charge density, meq/g theoretical/measured |
|---|---|---|---|---|---|---|---|---|---|
| 10[b] | 56 | 1 | 0.86% APS | 99.93/0.07 DADMAC/TAA | 1.87 | — | 1.21 | — | |
| 11[c] | 49 | 1 | 0.72% APS 0.36% V-50 | 99.975/0.025 DADMAC/TAPD | 1.28 | — | 0.87 | — | |

[a]The polymerization was run in the presence of 1% by weight of Span 80 and 1% by weight of Lonzest STO-20
[b]The polymerization was run in the presence of 1% by weight of Span 80, 1% by weight of Alkaterge T, 1% by weight of Lonzest ST-20 and 1% by weight of IL2296
[c]0.74% by weight of a chain transfer agent isopropanol based on the weight of DADMAC was mixed with DADMAC Example 2

Crosslinked PolyDADMAC Water-In-Oil Emulsions

An aqueous monomer phase was made by admixing diallyldimethylammonium chloride (645g, 62%), N,N,N-triallylamine hydrochloride (1.79 g, 27.8%), adipic acid (5.00 g), EDTA tetrasodium (0.08 g) and deionized water (18.25 g). The mixture was stirred and heated to a temperature between 35 and 40° C. to dissolve solid materials. The pH as adjusted with concentrated hydrochloric acid to between 3.5 and 3.8.

An oil phase was made by dissolving Span 80 (POE (20) sorbitan monooleate, 10.00 g), Mackamide NOA (10.00 g), Tween 61 (POE (4) sorbitan stearate, 5.00 g) and IL 2296 (a non-ionic surfactant from ICI, 10.00 g) in a mineral oil (Isopod M, 270 g)at a temperature of 50 to 55° C.

The monomer phase and oil phase were mixed together and homogenized until the particle size was in the range of 0.5 to 1.5 microns. The emulsion was then transferred into a 1.5 liter reactor and agitated. After the temperature stabilized at 45° C., ammonium persulfate (2.40 g) in deionized water (12.00 g) was fed via syringe bulb over 10 min. and further mixed for 45 min. V-64 (0.80 g) and V-52 (0.40 g) were added into the stirred emulsion. The emulsion was purged with nitrogen gas and heated for 2.0 hours at 45° C., 2.0 hours at 55° C., 2.0 hours at 65° C., and 2.0 hours at 75° C.

The finished crosslinked polyDADMAC emulsion was then cooled to 24° C. to yield Polymer No. 20. The DADMAC monomer conversion determined by residual DADMAC analysis with liquid chromatography was higher than 99%.

This procedure was repeated by varying the type and/or the amount of the crosslinking monomer in proportion to the base monomer to yield Polymer Nos. 12–19 and 21–26, as shown in Table 2. The solution reduced specific viscosity (RSV) and intrinsic viscosity (IV) were determined by preparing a 0.80% aqueous polymer solution wherein 4.00 grams of 40% emulsion product were dissolved in a 300 ml beaker containing a stirred dispersion of 195.00 grams deionized water and 1.00 gram inversion activator. The dispersion was agitated at 800 rpm for 60 min. with a caged stirrer. The resulting aqueous solution was further diluted to 0.30% by weight with 2M NaNO$_3$ and deionized water. 1.00% aqueous solutions were prepared similarly. The RSVs and IVs of Polymer Nos. 12–26 are shown below in Table 2.

TABLE 2

| Polymer No. | Feeding molar ratio | RSV (dl/g) of 0.30 wt % polymer in 1M NaNO$_3$ | RSV (dl/g) of 0.30 wt % polymer in 1M NaCl | RSV (dl/g) of 1.0 wt % polymer in 1M NaNO$_3$ | RSV (dl/g) of 1.0 wt % polymer in 1M NaCl | Intrinsic viscosity (dl/g) in 1M NaNO$_3$ | Intrinsic viscosity (dl/g) in 1M NaCl | Cationic Charge density, meq/g theoretical/measured |
|---|---|---|---|---|---|---|---|---|
| 12 | 99.85/.15 DADMAC/TAPD[a] | 0.56 | — | — | — | 0.39 | — | 6.19/6.09 |
| 13 | 99.950/0.050 DADMAC/TAPD | 2.51 | — | — | — | 1.51 | — | 6.19/6.65 |
| 14 | 99.975/0.025 DADMAC/TAPD | 2.36 | — | — | — | 1.63 | — | 6.19/6.50 |
| 15 | 99.25/0.75 DADMAC/TAA[b] | 0.74 | 1.41 | — | — | 0.48 | 1.39 | |
| 16 | 99.5/0.5 DADMAC/TAA | 3.57 | 6.55 | 6.44 | 12.34 | 2.10 | 4.08 | |
| 17 | 99.6/0.4 DADMAC/TAA | 1.58 | 2.99 | — | — | 1.14 | 2.04 | |
| 18 | 99.7/0.3 DADMAC/TAA | 4.07 | 7.18 | — | — | 2.17 | 3.76 | |
| 19 | 99.77/0.23 DADMAC/TAA | 3.40 | — | — | — | 1.66 | — | |
| 20 | 99.80/0.20 DADMAC/TAA | 3.93 | — | — | — | 2.06 | — | |

TABLE 2-continued

| Polymer No. | Feeding molar ratio | RSV (dl/g) of 0.30 wt % polymer in | | RSV (dl/g) of 1.0 wt % polymer in | | Intrinsic viscosity (dl/g) in | | Cationic Charge density, meq/g theoretical/measured |
|---|---|---|---|---|---|---|---|---|
| | | 1M NaNO$_3$ | 1M NaCl | 1M NaNO$_3$ | 1M NaCl | 1M NaNO$_3$ | 1M NaCl | |
| 21 | 99.8/0.2 DADMAC/TAA | 2.11 | — | — | — | 1.69 | — | |
| 22 | 99.95/0.05 DADMAC/TAA | 1.27 | — | — | — | 1.07 | — | |
| 23 | 99.95/0.05 DADMAC/MBA[c] | 1.96 | — | — | — | 1.13 | — | |
| 24 | 99.975/0.025 DADMAC/MBA | 2.82 | — | — | — | 1.71 | — | |
| 25 | 99.9875/0.0125 DADMAC/MBA | 1.79 | — | — | — | 1.30 | — | |
| 26 | 99.99375/0.00625 DADMAC/MBA | 1.57 | — | — | — | 1.02 | — | |

[a]Tetraallylpiperazinium dichloride
[b]Triallylamine
[c]Methylene bisacrylamide Example 3

Reference Polymers

Polymer Nos. 27–33, listed below in Table 3, are standard polymers used in the papermaking industry.

TABLE 3

| Polymer No. | Composition | Theoretical cationic charge density, meq/g | Measured cationic charge density, meq/g | Intrinsic viscosity in 1M NaNO$_3$, dl/g |
|---|---|---|---|---|
| 27 | NH$_3$-crosslinked EPI/DMA | — | — | 0.3 |
| 28 | linear polyDADMAC | 6.19 | — | 0.08 |
| 29 | linear polyDADMAC | 6.19 | — | 0.41 |
| 30 | linear polyDADMAC | 6.19 | — | 0.69 |
| 31 | linear polyDADMAC | 6.19 | — | 1.03 |
| 32 | linear polyDADMAC | 6.19 | — | 1.96 |
| 33 | 50/50 by weight DADMAC/AcAm[a] | — | — | — |

[a]diallyldimethylammonium chloride/acrylamide copolymer

Example 4

Performance Evaluation in Anionic Trash and Pitch Deposition Control

Three methods, namely, the pulp filtrate turbidity test, pulp filtrate cationic demand test and the pitch deposition test, were used to evaluate polymer performance in anionic trash and pitch deposition control. Although each of these tests is believed to measure the polymer's ability to control anionic trash and pitch in a system, each test method measures some different aspect of the anionic trash/pitch problems.

A new polymer's performance efficiency in any specific test can be evaluated by its replacement ratios versus a standard polymer. At a given equal performance level, the replacement ratio of a new polymer versus a standard polymer is obtained by dividing the dose (e.g. lbs. polymer/ton paper) necessary to produce the given performance level with the new polymer by the dose necessary to produce the same performance level with the standard polymer. If the replacement ratio is 1.00, the new polymer is as efficient as the standard polymer. If the replacement ratio is larger than 1.00, the polymer is less efficient than the standard polymer. If the replacement ratio is less than 1.00, the new polymer is more efficient than the standard polymer and, the lower the number, the more efficient the new polymer is compared to the standard polymer.

Filtrate Turbidity and Cationic Demand Test

After adding a thermal mechanical pulp (3 to 5 wt % consistency) to a Hobart model N-50 Dough mixer and mixing for an initial period, a polymer was dosed and allowed to mix for a fixed amount of time. The pulp was then vacuum filtered to a fixed volume, and a portion of the filtrate was used for cationic demand measurement and another portion for turbidity measurement. The experimental conditions and procedures used to measure the filtrate cationic demand and filtrate turbidity are provided in Table 4. The pulp temperature was maintained at approximately 30° C. A Metron 716 DMS Titrino automatic titrator was used for the colloidal titration with Mutek endpoint. The Mutek cell and piston were cleaned with a 50/50 mixture of water/acetone after each titration. A Hach 2100 A turbidimeter was used to monitor filtrate turbidity mainly on the 0–100 scale.

TABLE 4

| | |
|---|---|
| Sample Size | 600 ml of ≅ 4.5 wt % consistency |
| Mixer | Dough mixer on medium speed (#2) |
| Filter Paper | 19 cm Filpaco |
| Filtrate Volume | 300 ml |
| Timing Sequence | t = 0 start mixing |
| | t = 10 add polymer |
| | t = 70 end mixing |
| Turbidity Monitor | Hach 2100A |
| Cationic Demand | Direct colloid titration with Mutek endpoint |

The filtrate cationic demand reduction % was calculated using the following equation:

$$\text{Filtrate cationic demand reduction \%} = \frac{(\text{filtrate cationic demand})_{\text{no treatment}} - (\text{filtrate cationic demand})_{\text{treatment}}}{(\text{cationic demand})_{\text{no treatment}}} \times 100\%$$

The filtrate turbidity reduction was calculated using the following equation:

$$\text{Filtrate turbidity reduction} = \frac{(\text{filtrate turbidity})_{\text{no treatment}} - (\text{filtrate turbidity})_{\text{treatment}}}{(\text{filtrate turbidity})_{\text{no treatment}}} \times 100\%$$

Linear polyDADMACs were evaluated in order to identify the effect of polymer molecular weight or intrinsic viscosity (IV) in these activity tests. Linear polyDADMAC comparisons of cationic demand reduction in a thermal mechanical pulp are shown in Tables 5 and 6.

The lower replacement ratios in Table 5 relative to the standard polyDADMAC (Polymer No. 30) for crosslinked Polymer Nos. 1, 2, 6, 13 and 14 show the improved activity of these polymers, i.e., the amount of polymer required to achieve a given level of reduction is less by 10 to 30% depending on the particular polymer and performance level desired. The improvement in polymer efficiency, moreover, does not simply arise from increased molecular weight, as measured by IV. As shown in Tables 5 and 6, when the linear polyDADMACs of different IV are compared to the reference polymer, there is no change in efficiency for IV greater than or equal to 0.41 dl/g. However, a loss in efficiency occurs when the IV is low enough, i.e., less than 0.41 dl/g.

TABLE 5

Replacement Ratios with Polymer No. 30 as the Standard
(Pulp filtrate cationic demand with no polymer treatment was 0.328 meq/l)

| % Cationic Demand Reduction | Polymer No. 30 | Polymer No. 1 | Polymer No. 2 | Polymer No. 6 | Polymer No. 13 | Polymer No. 14 | Polymer No. 28 |
|---|---|---|---|---|---|---|---|
| 40 | 1 | 0.80 | 0.60 | 0.70 | 1.06 | 0.61 | 2.82 |
| 50 | 1 | 0.81 | 0.80 | 0.74 | 0.99 | 0.72 | 2.88 |
| 58 | 1 | 0.90 | 0.93 | 0.84 | 0.93 | 0.80 | 3.03 |
| 65 | 1 | 0.97 | 1.00 | 0.98 | 0.90 | 0.89 | |
| 72 | 1 | 1.03 | 1.06 | 1.00 | 0.78 | 0.85 | |

TABLE 6

Replacement Ratios with Polymer No. 31 as the Standard
(Pulp filtrate cationic demand with no polymer treatment was 0.238 meq/l)

| % Cationic Demand Reduction | Polymer No. 31 | Polymer No. 29 | Polymer No. 30 |
|---|---|---|---|
| 30 | 1 | 1.33 | 1.16 |
| 40 | 1 | 1.08 | 1.00 |
| 45 | 1 | 0.93 | 0.86 |
| 50 | 1 | 0.89 | 0.81 |
| 60 | 1 | 0.98 | 0.94 |
| 70 | 1 | 1.03 | 1.05 |

A comparison of the filtrate turbidity activities between linear Polymer Nos. 30 and 28, and crosslinked polyDADMACs is made in Table 7. As this table shows, no polymer efficiency is lost for the crosslinked polyDADMACs relative to the linear polymers.

TABLE 7

Replacement Ratios with Polymer No. 30 as the Standard
(Pulp filtrate turbidity with no polymer treatment was 110 NTU)

| % Filtrate Turbidity Reduction | Polymer No. 30 | Polymer No. 1 | Polymer No. 2 | Polymer No. 6 | Polymer No. 14 | Polymer No. 28 |
|---|---|---|---|---|---|---|
| 40 | 1 | 1.03 | 0.95 | 1.03 | 1.00 | 8.03 |
| 50 | 1 | 1.04 | 0.94 | 1.02 | 1.00 | 8.00 |
| 60 | 1 | 1.01 | 0.93 | 1.00 | 0.97 | 8.96 |
| 70 | 1 | 1.02 | 0.96 | 1.00 | 0.96 | |
| 80 | 1 | 1.07 | 0.97 | 0.97 | 0.95 | |
| 90 | 1 | 1.04 | 1.01 | 0.97 | 0.95 | |

As shown in Tables 5 and 7, the crosslinked polyDADMACs of this invention exhibited enhanced performance relative to the linear polyDADMACs in the filtrate cationic demand reduction test and equal performance in the filtrate turbidity reduction test.

Pitch Deposition Test

The pitch deposition test used in this invention provides another way to differentiate the polymer's performance in pitch deposition reduction. In accordance with this test procedure, a 2.0% softwood pitch aqueous solution in 0.5% NaOH (a fixed volume for each set of tests to give a pitch concentration from 4580 to 5682 ppm) was added to 500 mls of bleached hard wood kraft pulp obtained either from a paper mill or freshly made from dry lap in deionized water (1.4 to 1.7% consistency). The pH of the pulp was then adjusted with concentrated hydrochloric acid to 6.0. The test pulp was poured into a Osterizer blender container. A 0.5M calcium chloride dihydrate aqueous solution (a fixed volume for each set of tests to give a calcium ion concentration from 284 to 382 ppm as $CaCO_3$) was added into the blender container, and the pitch control agent to be tested was added at this point. A preweighed polytetrafluoroethylene coupon was immersed in the test pulp. The test pulp was mixed at a fixed medium blender speed for five minutes. The coupon now coated with deposited pitch was removed, gently rinsed with deionized water to remove any fiber adhering to the coupon surface, and dried. The original weight of the coupon was subtracted from the weight of the coupon plus deposited pitch in order to obtain the pitch deposit weight. The percent inhibition (reduction) of pitch deposit was calculated according to the following equation:

$$\% \text{ pitch inhibition (reduction)} = \frac{(\text{PDW})_{\text{avg. control}} - (\text{PDW})_{\text{treated}}}{(\text{PDW})_{\text{avg. control}}} \times 100\%$$

where PDW=pitch deposit weight (mg).

The synthetic wood pitch used in the pitch deposition tests was common wood pitch components. Solutions of the synthetic pitch compositions were added to the laboratory pulps to form a colloidal pitch dispersion similar to real wood pitch in actual papermaking pulps, only at a higher effective concentration, so that in the pitch deposition test a measurable pitch deposit could be obtained from a relatively small quantity of pulp in a reasonably short time period. The synthetic pitch compositions typically included the following components:

| | |
|---|---|
| Abietic acid (a resin acid) | 5–50% |
| Oleic acid | 10–25% |
| Palmitic acid | 5–10% |
| Corn oil | 10–35% |
| Oley Alcohol | 2.5–7.5% |
| Methyl Stearate | 5–15% |
| β-Sitosterol | 2.5–7.5% |
| Cholesteryl Caproate | 2.5–7.5% |

Tables 8–12, described in more detail below, illustrate how the branched or crosslinked polyDADMACs of this invention outperform all other polymers (including linear polyDADMACs) in the pitch deposition inhibition test in terms of higher efficiency.

As shown in Table 8, the inverse emulsion crosslinked Polymer No. 13 is more efficient than linear polymer Nos. 29 and 32 regardless of IV. In addition, solution Polymer No. 1 outperforms the conventional polyDADMAC of lower IV (Polymer No. 29), but is not quite as efficient as high IV polyDADMAC (Polymer No. 32) in these pitch deposition results.

TABLE 8

Replacement Ratios with Polymer No. 29 as the Standard (with hard wood kraft pulp (1.4% consistency) made from dry lap, soft wood pitch (4580 ppm), Ca as $CaCO_3$ (382 ppm) at pH 6.0, initial deposition mass 372(16) mg)

| % Pitch Deposit Inhibition | Polymer No. 29 | Polymer No. 1 | Polymer No. 13 | Polumer No. 32 |
|---|---|---|---|---|
| 60 | 1 | 0.83 | 0.33 | 0.65 |
| 80 | 1 | 0.79 | 0.29 | 0.59 |
| 90 | 1 | 0.65 | 0.31 | 0.58 |
| 95 | 1 | 0.59 | 0.31 | 0.59 |

As illustrated in Table 9, the crosslinked polyDADMACs of the present invention exhibited exceptional efficiencies relative to linear Polymer No. 30. The doses of crosslinked polymers required to achieve a fixed performance were reduced by as much as 94%.

TABLE 9

Replacement Ratios with Polymer No. 30 as the Standard (with hard wood kraft pulp (1.58% consistency) made from dry lap, soft wood pitch (5682 ppm), Ca as $CaCO_3$ (284 ppm) at pH 6.0, initial deposition mass 372(16) mg)

| % Pitch Deposit Inhibition | Polymer No. 30 | Polymer No. 13 | Polymer No. 14 |
|---|---|---|---|
| 40 | 1 | 0.16 | 0.06 |
| 50 | 1 | 0.15 | 0.07 |
| 60 | 1 | 0.16 | 0.07 |
| 70 | 1 | 0.18 | 0.08 |
| 80 | 1 | 0.19 | 0.15 |
| 90 | 1 | 0.18 | 0.60 |

Table 10 further illustrates the increased efficiency of the branched or crosslinked polyDADMACs relative to the linear polyDADMAC (Polymer No. 30). The dose of the solution crosslinked polyDADMAC (Polymer No. 4) was approximately 25 to 50% less, while the best inverse emulsion polyDADMACS (Polymer Nos. 19 and 20) required only 0.2 to 0.4 of the dose of the linear polyDADMAC, depending on the performance level required.

TABLE 10

Replacement Ratios with Polymer No. 30 as the Standard (with hard wood kraft pulp (1.7% consistency) made from dry lap, soft wood pitch (5674 ppm), Ca as $CaCO_3$ (345 ppm) at pH 6.0, initial deposition mass 354(19) mg)

| % Pitch Deposition Reduction | Polymer No. 30 | Polymer No. 4 | Polymer No. 11 | Polymer No. 19 | Polymer No. 20 | Polymer No. 21 |
|---|---|---|---|---|---|---|
| 20 | 1 | 0.25 | 0.28 | 0.20 | 0.20 | 0.24 |
| 40 | 1 | 0.35 | 0.37 | 0.27 | 0.26 | 0.30 |
| 60 | 1 | 0.57 | 0.59 | 0.33 | 0.32 | 0.39 |
| 70 | 1 | 0.75 | 0.78 | 0.38 | 0.35 | 0.59 |
| 80 | 1 | 0.59 | 0.60 | 0.31 | 0.29 | 0.56 |
| 88 | 1 | 0.58 | 0.60 | 0.28 | 0.36 | 0.54 |

Table 11 again shows the improved efficiencies of solution crosslinked polyDADMACs over a conventional linear polyDADMAC, with a dose of one-half or less being required to achieve equal performance.

TABLE 11

Replacement Ratios with Polymer No. 30 as the Standard (with hard wood kraft pulp (1.7% consistency) made from dry lap, soft wood pitch (5674 ppm), Ca as $CaCO_3$ (354 ppm) at pH 6.0, initial deposition mass 514 mg)

| % Pitch Deposit Inhibition | Polymer No. 30 | Polymer No. 5 | Polymer No. 10 |
|---|---|---|---|
| 20 | 1 | 0.38 | 0.33 |
| 40 | 1 | 0.30 | 0.42 |
| 60 | 1 | 0.39 | 0.50 |
| 80 | 1 | 0.31 | 0.52 |
| 88 | 1 | 0.42 | 0.52 |

Table 12 shows the improved efficiencies of crosslinked polyDADMACs over linear polyDADMACs using a virgin kraft pulp. Crosslinked polyDADMACs required less than one-tenth the dose of conventional polyDADMACs in the best cases.

TABLE 12

Replacement Ratios with Polymer No. 29 as the Standard
(with virgin hard wood kraft pulp (1.7% consistency) from a mill, soft wood pitch
(5674 ppm), Ca as CaCO₃ (354 ppm) at pH 6.0, initial deposition mass 398 (44) mg)

| % Pitch Deposit Reduction | Polymer No. 29 | Polymer No. 5 | Polymer No. 18 | Polymer No. 19 | Polymer No. 20 | Polymer No. 32 | Polymer No. 36 |
|---|---|---|---|---|---|---|---|
| 20 | 1 | 0.73 | 0.37 | 0.34 | 0.31 | 0.46 | 0.73 |
| 40 | 1 | 0.64 | 0.31 | 0.29 | 0.37 | 0.49 | 0.59 |
| 60 | 1 | 0.15 | 0.07 | 0.07 | 0.07 | 0.11 | 0.13 |
| 70 | 1 | 0.14 | 0.06 | 0.07 | 0.06 | 0.11 | 0.13 |

The branched or crosslinked polyammonium quat of this invention has been demonstrated in the examples above to act as an effective and efficient coagulant in controlling anionic trash and pitch in papermaking systems. The branched or crosslinked polyammonium quat can be added to the pulp at any stage of the papermaking system, either alone or in combination with other components including, but not limited to, hydrolyzing aluminum salts, zirconium salts, talc, clays and other polymers. The effective amount of the branched or crosslinked polyammonium quat to be added depends upon a number of variables including the pH of the system, hardness, temperature, anionic trash content and pitch content of the pulp. Generally, 0.1 to 6 pounds of the polyammonium quat per ton of dry pulp and preferably, 0.2 to 2 pounds of the polyammonium quat per ton of dry pulp, is added to the pulp slurry.

The branched or crosslinked polyammonium quat of this invention is effective in controlling anionic trash and pitch deposition in various papermaking systems, such as chemical pulp (Kraft and sulfite), mechanical pulp (TMP, GW, PGW, CTMP, Semi-chemical) and recycled pulp processes. For example, pitch deposition in the brown stock washer, screen room and decker systems in Kraft papermaking processes can be controlled. The term "papermaking" is meant to include all pulp processes. Generally, it is thought that the polyammonium quats can be utilized to prevent pitch deposition on all paper machine surfaces from the pulp mill to the reel of the paper machine under a variety of pHs and conditions. More specifically, the polyammonium quats effectively decrease the deposition of metal soap and other resinous pitch components not only on the metal surfaces, but also on plastic and synthetic surfaces such as machine wires, felts, foils, uhle boxes and headbox components. The polyammonium quats of this invention can also be used to reduce flocculent dose in retention and drainage processes.

Example 5

Performance Evaluation in Coated Broke Treatment

A filtrate turbidity test was used to evaluate coagulant activity. This test measures the ability of the test coagulant polymer to retain coated broke materials during vacuum filtration through a coarse filter paper. The test procedure and conditions are set forth below in Table 13.

TABLE 13

| | |
|---|---|
| Sample size | 200 ml coated broke |
| Mixing speed | 500 rpms with Britt Jar propeller in 400 ml beaker |
| Filtration | 9 cm Buchner funnel and 500 ml filter flask with Reeve Angel 230 filter paper; sample filtered to completion |

TABLE 13-continued

| | |
|---|---|
| Test | Measure turbidity of 10 to 20 ml filtrate diluted to 50 ml with deionized water with a Hach turbidimeter |

Using this test procedure, the majority of pigment materials readily passed through the filter such that turbidity of undiluted filtrates were always too high to be measured directly. As a result, a dilution was generally required to bring the turbidity into an acceptable range for measurement by the Hach turbidimeter. Because filtrate is improved by the filter cake formed on the filter paper, the turbidity of the filtrate is therefore a function of time during the filtration test. Thus, the samples were filtered to completion and the filtrate was collected and measured, thereby eliminating any such time dependence.

The percent turbidity reduction was calculated from the filtrate turbidity data according to the following equation:

$$\% \text{ Turbidity reduction} = \frac{\text{turbidity of untreated broke filtrate} - \text{turbidity of treated broke filtrate}}{\text{turbidity of untreated broke filtrate}} \times 100\%$$

This method of presenting data emphasizes the amount of retention rather than the turbidity of the water attainable. Replacement ratios were measured on the basis of the above technicals. The use of replacement ratios indicates that polymers are being evaluated on an efficiency basis measured by the amount of polymer required to achieve a given performance level versus a standard material. The replacement ratios from three different sources of coated broke are shown in Tables 14–16, wherein the pulp was prepared from 600 grams of dry broke and 15 liters of deionized water. Because replacement ratios represent the amount of polymer needed to replace the standard, values less than 1 are desirable.

In this test, various crosslinked polyDADMACs of the present invention were compared with Polymer No. 27 (ammonia-crosslinked EPI-DMA polymer) and with Polymer No. 33 (a DADMAC/AcAm emulsion copolymer having 50/50 weight percent). As demonstrated in Tables 14–16, the crosslinked polyDADMACs are more effective and efficient than Polymer No. 27 and more efficient than Polymer Nos. 29 and 32 (linear polyDADMACs) for all coated broke pulps tested, and at least as efficient as Polymer No. 33.

TABLE 14

| % Turbidity Reduction | Polymer No. 27 | Polymer No. 1 | Polymer No. 2 | Polymer No. 3 | Polymer No. 29 | Polymer No. 32 | Polymer No. 33 |
| --- | --- | --- | --- | --- | --- | --- | --- |
| 50 | 1 | 0.86 | 0.86 | 0.86 | 1.00 | 0.94 | 0.80 |
| 60 | 1 | 0.83 | 0.83 | 0.83 | 1.00 | 0.94 | 0.78 |
| 70 | 1 | 0.60 | 0.60 | 0.60 | 0.80 | 0.66 | 0.53 |
| 80 | 1 | 0.40 | 0.44 | 0.44 | 0.90 | 0.70 | 0.38 |
| 90 | 1 | 0.28 | 0.29 | 0.30 | — | 0.31 | 0.21 |

TABLE 15

| % Turbidity Reduction | Polymer No. 27 | Polymer No. 1 | Polymer No. 2 | Polymer No. 4 | Polymer No. 33 |
| --- | --- | --- | --- | --- | --- |
| 50 | 1 | 0.94 | 0.92 | 0.82 | 0.40 |
| 70 | 1 | 0.92 | 0.92 | 0.89 | 0.60 |

TABLE 16

| % Turbidity Reduction | Polymer No. 27 | Polymer No. 1 | Polymer No. 2 | Polymer No. 4 | Polymer No. 14 | Polymer No. 16 | Polymer No. 18 | Polymer No. 33 |
| --- | --- | --- | --- | --- | --- | --- | --- | --- |
| 50 | 1 | 0.70 | 0.53 | 0.50 | 0.50 | 0.40 | 0.53 | 0.47 |
| 70 | 1 | 0.64 | 0.56 | 0.48 | 0.47 | 0.26 | 0.47 | 0.56 |

The amount of branched or crosslinked polyammonium quat which has been found effective and efficient for coagulating white pitch and its components, namely the pigments and binders described above, ranges from 0.2 pounds active polymer per ton of total broke solids up to and including about 10 pounds active polymer per ton of total broke solids.

Preferably, treatment levels range from about 0.5 pounds polymer active per ton of total broke solids to about 5 pounds per ton. Most preferably, the effective treatment ranges are between 0.75 pounds per ton to about 3.5 pounds per ton, although each source of coated broke has its own character and the treatment level demand to treat white pitch does vary with the source of coated broke fibers.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of controlling anionic trash and pitch deposition in a pulp containing broke during papermaking, comprises the step of adding to said pulp a polyammonium quaternary comprising a cationic monomer and a crosslinking monomer; wherein said pulp has a solids level of from about 3 weight percent to about 5 weight percent; wherein said cationic monomer is diallyldimethylammonium chloride and said crosslinking monomer is selected from the group consisting of N,N-diallylamine, N,N-diallylamine hydrochloride, N,N,N-triallylamine N,N,N-triallylamine hydrochloride methylene bisacrylamide, N,N,N'N'-tetraallylpiperazinium dichloride and mixtures thereof; wherein said polyammonium quaternary is added to said pulp in an amount from about 0.1 to about 6 pounds of polyammonium quaternary per ton of dry pulp; and wherein the molar ratio of said cationic monomer to said crosslinking monomer is from about at least greater than 99.9% cationic monomer to at least less than 0.1% crosslinking monomer.

2. The method of claim 1 wherein the polyammonium quaternary is branched.

3. The method of claim 1 wherein the polyammonium quaternary is crosslinked.

4. The method of claim 1 wherein said crosslinking monomer is N,N,N-triallylamine.

5. The method of claim 1 wherein said crosslinking monomer is N,N,N-triallylamine hydrochloride.

* * * * *